United States Patent [19]

Lomax et al.

[11] Patent Number: 4,679,294
[45] Date of Patent: Jul. 14, 1987

[54] METHOD FOR MAKING A TRIMETALLIC CYLINDER

[76] Inventors: Donald P. Lomax, 649 Stourbridge Pl., P.O. Box 232, Wales, Wis. 53183; Ronald M. Boggs, P.O. Box 253, Genesee, Wis. 53127

[21] Appl. No.: 801,296

[22] Filed: Nov. 25, 1985

Related U.S. Application Data

[62] Division of Ser. No. 396,623, Jul. 9, 1982, abandoned.

[51] Int. Cl.$^4$ .............................................. B23P 19/04
[52] U.S. Cl. ..................................... 29/460; 138/109; 138/143; 164/108; 228/182; 285/55; 427/234
[58] Field of Search .............................. 29/460; 228/182; 285/55; 138/140, 143, 109; 427/232, 234; 164/108, 110, 114, 118

[56] References Cited

U.S. PATENT DOCUMENTS

| | | | |
|---|---|---|---|
| 525,676 | 9/1894 | Burdon | 427/232 X |
| 1,923,075 | 8/1933 | Brown | 427/234 X |
| 2,046,913 | 7/1936 | Kormann et al. | |
| 2,046,914 | 7/1936 | Kormann et al. | |
| 2,319,657 | 5/1943 | Brown | 427/234 |
| 2,470,689 | 5/1949 | Crampton et al. | 427/232 |
| 3,020,068 | 2/1962 | Costanzo | 285/55 |
| 3,287,801 | 11/1966 | Blenkarn | 29/460 |
| 3,551,188 | 12/1970 | Lindquist | 427/234 |

FOREIGN PATENT DOCUMENTS 11754  5/1969  Japan ..................................... 285/55

*Primary Examiner*—Charlie T. Moon
*Attorney, Agent, or Firm*—Cooper, III: John C.; Fred Wiviott

[57] ABSTRACT

A trimetallic cylinder according to the preferred embodiment of the present invention includes a mild or alloy steel cylindrical body with stainless steel end rings welded or otherwise suitably joined to each end of the body. A wear and corrosion resistant alloy lining is provided for the composite cylinder, the combination resulting in improved corrosion resistance for the overall assembly.

3 Claims, 4 Drawing Figures

METHOD FOR MAKING A TRIMETALLIC CYLINDER

This is a division of application Ser. No. 396,623, filed July 9, 1982, now abandoned.

FIELD OF THE INVENTION

This invention relates generally to steel cylinders lined with a hard, wear and corrosion resistant alloy and more particularly to such cylinders which include stainless steel end rings. Cylinders of the type described may be used in extrusion and injection molding equipment, in food processing and in a variety of other uses where cylinders having high strength and corrosion resistance are required.

BACKGROUND OF THE INVENTION

Bimetallic cylinders have been employed in the plastic extrusion and injection molding industries for many years. For purposes of this specification, a bimetallic cylinder is one which includes a cylindrical body and a lining of a hard and wear and corrosion resistant metal or alloy. Bimetallic cylinders have become widely accepted because in extrusion or injection molding a screw forces a hot, molten plastic through a special shaped die and typically the plastics include abrasive filler materials. As a result of the high temperatures employed in the process, the abrasive fillers and the action of the screw itself, standard steel cylinders quickly wore or became corroded.

Kormann and Hirsch were pioneers in the development of of bimetallic cylinders in the early 1930's and some of their work is described in U.S. Pat. Nos. 2,049,913 and 2,046,914, each issued July 7, 1936. The process for preparing bimetallic cylinders described in these patents comprises placing a steel cylinder in a horizontal position and loading the cylinder with a quantity of an alloy having a melting point less than the cylinder itself. The alloy has greater wear and corrosion resistance properties than the cylinder. The ends of the cylinder are closed by welding caps over them and the cylinder is gradually heated above the melting point of the lining material. The cylinder is rapidly spun about its axis to centrifugally spread the melted lining material over the inner surface of the cylinder. The cylinder is then cooled gradually, the end caps are removed and laths and hones are used to finish the inside surface to the desired diameter and smoothness.

A variety of different alloys have been used for the lining of bimetallic cylinders. Ferrous alloys were used by Kormann and Hirsch in the aforementioned U.S. Pat. No. 2,049,913 and by Saltzman in his U.S. Pat. No. 3,658,515 issued Apr. 25, 1972. The ferrous materials have a hardness in the approximate range of 58-64 Rockwell C and exhibit good wear resistance when used in bimetallic cylinders. However, ferrous alloys are not particularly well suited for use in corrosive environments and attempts to improve corrosion resistance in ferrous alloys usually led to reduced wear resistance.

More recently, non-ferrous lining alloys have been developed for use in bimetallic cylinders. One type includes about 40% nickel, 45% colbalt, 8% chromium and 3% boron in addition to minor amounts of carbon, manganese, silicon, etc. Still more recently carbide particles have been mixed with the non-ferrous base metal to improve performance. One particularly useful carbide alloy is described in U.S. Pat. No. 4,089,466 issued to the present inventors on May 16, 1978. The latter contains 10-35% tantalum carbide in a matrix alloy comprising 0.16-0.35% carbon, 28.5-34.6 nickel, 9.5-7.5% chromium and 28.5-42.0% colbalt (all weights being expressed in weight percent). Still more recently, an improved alloy has been marketed which includes a mixture of at least two carbides admixed with a nickel-cobalt base alloy.

While the state of the art is well advanced in terms of lining alloys and the design thereof for particular end use applications, little attention has been directed to the performance of the overall cylinder. Moreover, in recent years bimetallic cylinders have been used in a variety of applications other than injection molding and extrusion. For example, such cylinders are rapidly replacing unlined or chrome plated stainless steel cylinders in the food and drink processing industries.

The introduction of bimetallic cylinders for such end uses has, however, led to additional problems which have not been overcome prior to the present invention. In many food applications, the cylinders are subjected to daily acid washings, e.g. for 45 minutes at 175° F. Also, in some applications, the entire cylinder may be surrounded by a cooling fluid or heating liquid and exterior corrosion has resulted. Corrosion is most noticeable and most troublesome at the ends of the cylinder where they may be clamped or supported in the particular apparatus in which they are used. Such corrosion problems have hindered the commercial acceptance of bimetallic cylinders in new industries.

OBJECTS AND SUMMARY OF THE INVENTION

It is a primary object of the present invention to provide a trimetallic cylinder which overcomes the above-noted disadvantages of the prior art.

Another object of the present invention is to provide a trimetallic cylinder having improved corrosion resistance.

A further object of the present invention is to provide a trimetallic cylinder which has desirable heat transfer characteristics and corrosion resistance when the cylinder is surrounded by corrosive fluids or gases.

A still further object of the present invention is to provide a trimetallic cylinder having improved corrosive resistance near the ends of the cylinder.

How these and other depicts of the invention are accomplished will be described in the following specification, taken in conjuntion with the drawings. Generally, however, they are accomplished by providing a trimetallic cylinder which includes a mild steel or alloy barrel and end rings constructed of stainless steel or other corrosion resistant material. The assembly is lined with a wear and corrosion resistant alloy, such as those which have previously been used to prepare bimetallic cylinders. Preferably, the lining is accomplished using centrifugal coating as is known to the art.

DESCRIPTION OF THE PREFERRED EMBODIMENT

Figure 1:
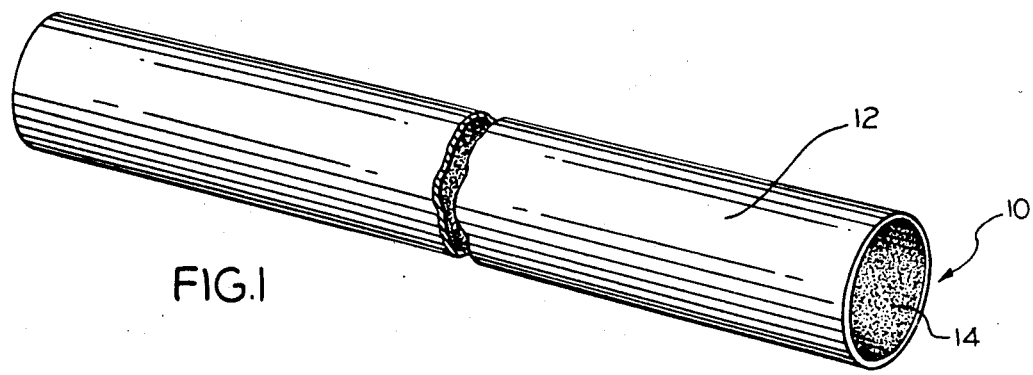
FIG. 1 is a perspective view of a typical bimetallic cylinder as is known to the prior art.

FIG. 1 illustrates a typical bimetallic cylinder 10 known to the prior art which includes a mild steel barrel 12 having on its inner surface a lining of a wear and corrosion resistant alloy 14. Alloy steels have also been used for barrel 12 and, together with mild steels, provide a readily available, reasonably priced backing material which provides excellent tensile strength. Such backing materials also provide excellent heat exchange characteristics (nearly twice that of stainless steel and nearly as effective as the much higher priced nickel/chrome materials used for some prior art heat exchangers).

Lining alloy 14 is added to barrel 12 by placing a predetermined amount of the lining alloy into barrel 14 and welding end caps over each end of the barrel. The barrel is then heated to a temperature high enough to melt the lining alloy. The hot barrel is then rotated at high speed, centrifugally coating the interior with the stronger alloy lining. During the process, the molecules of the lining alloy and the backing material are believed to undergo an interchange, creating an inseparable metallurgical bond. Following cooling, the end caps are removed and bimetal tube is finish honed and further machined or fabricated as specified. Details of the bimetallic cylinder preparation method will not be provided here, as such process does not in and of itself form part of the present invention. If such details are desired, reference may be had to the disclosures of the patents referred to earlier in this specification, such disclosures being expressly incorporated herein by this reference.

Figure 2:
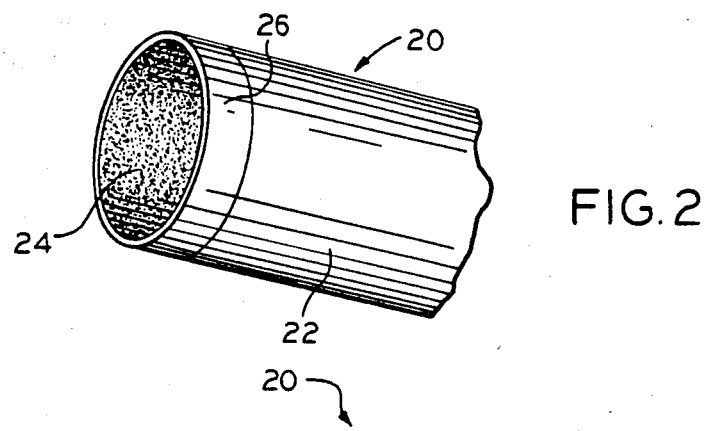
FIG. 2 is a partial perspective view of a trimetallic cylinder prepared according to the present invention.

FIG. 2 shows a trimetallic cylinder 20 according to the present invention. Cylinder 20 includes a mild or alloy steel barrel 22 and a lining of a corrosion resistant alloy 24, each of which may be similar to the materials previously described. Cylinder 20 differs from cylinder 10, however, in that it includes stainless steel end rings 26 which may be located at one, but preferably are located at both ends of cylinder 20. The width of rings 26 may vary from about 1-2 inches up to much larger widths depending on the particular use to which the cylinder is to be put. Moreover, the particular type of stainless steel may be selected by the cylinder manufacturer depending on the final use and the degree of corrosive exposure.

In fabricating cylinder 20, the stainless steel rings 26 are attached to the barrel 22 prior to centrifugally casting the lining alloy 24. In this way, the lining alloy is applied to the barrel and to the end rings 26. By way of illustration, rather than limitation, the thickness of the lining alloy may be on the order of 1/32" to 3/32" to provide desirable wear protection and corrosion resistance to the inside of cylinder 20, even in applications involving screw expulsion or scraper blade movement within the barrel 24. Furthermore, the overall cylinder may range from an outside diameter of only a few inches up to a foot or more and the length may range to 20 feet or even more for some applications.

Figure 3:
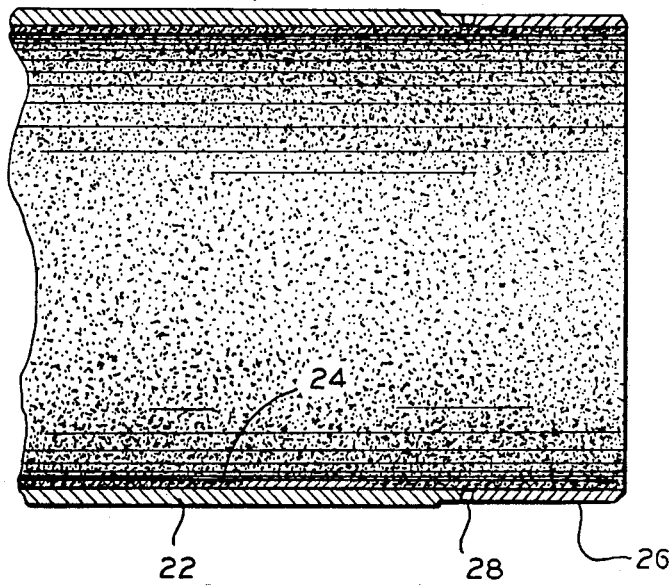
FIG. 3 is a longitudinal section through one end of the cylinder shown in FIG. 2; and, FIG. 4 is a partial longitudinal section of a trimetallic cylinder according to the present invention showing a different weld technique for joining the stainless steel end ring to the barrel of the cylinder.
Figure 4:
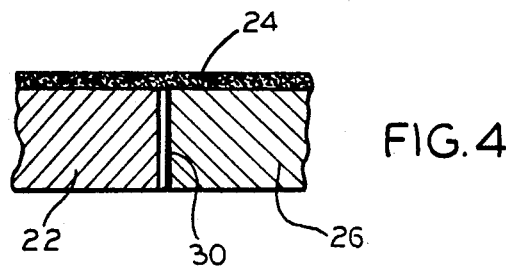

Referring next to FIGS. 3 and 4, it will be appreciated that the end rings may be of a slightly narrower thickness than the barrel 22, or they may be of the same thickness. It is important, however, that the inside surface of rings 26 and barrel 22 be the same to provide a smooth surface for the application of lining alloy 24.

The preferred techniques for joining the rings 26 to barrel 22 is the use of a friction or inertia weld 28 (FIG. 3), but a conventional weld joint 30 (FIG. 4) may also be used. Following the welding operation, the fabricator should insure that the inside surface of the weld is smooth for the reasons mentioned heretofore. Following the application of the end rings, the lining alloy is inserted into the cylinder and the end caps are welded to the stainless rings. In all other respects, the casting of the lining alloy and the finishing steps are the same as for bimetallic cylinders.

As described above, a large number of lining alloys can be employed to prepare the trimetallic cylinders of the present invention. The alloys may be of the ferrous or non-ferrous types and may contain the carbide particles as mentioned earlier in this specification. For use with food processing equipment, a preferred lining alloy is a nickel/chromium/cobalt alloy which produces a lining having the following properties: macrohardness 48–54 Rc, nominal tensile strength 35,000/51,000 psi, nominal compressive strength 250,000 psi, strain to facture 0.21% and density 0.302 lb/in$^3$. The combination of such an alloy in a trimetallic cylinder provides a cylinder which is highly corrosion and wear resistant. The cylinder may be used with any type of scraper blades and because it has a thicker lining than chrome plated tubes previously used in the food art, wear time is greatly increased. The lining allows 100% contact of the scraper blades and which provides a metallurgical non-flaking bond to the barrel and rings as opposed to an electrolytic bond which exists in the chrome plated nickel cylinders of the prior art. The mild alloy barrel 22 provides excellent heat exchange capabilities.

While the present invention has been described with reference to a preferred embodiment and one alternate embodiment, it is not to be limited thereto, but is to be limited solely by the claims which follow.

We claim:

1. A method for making a trimetallic cylinder comprising the steps of:
   providing a metal cylinder;
   welding an end ring onto each end of said metal cylinder, said end rings being of a material which is more corrosion resistant than said metal cylinder, said welding step providing a cylinder having a common bore;
   placing in said cylinder a quantity of a lining alloy having a melting point less than said metal cylinder and said end rings;
   placing end caps on said cylinder and heating said cylinder above the melting point of said lining alloy;
   spinning said cylinder about its axis to certrifugally coat the bore of said cylinder with said lining alloy and to form a metallurgical bond between said lining alloy and said bore of both the cylinder and rings, and,
   cooling said cylinder, removing said end caps and finishing the inner surface of said cylinder.

2. The invention set forth in claim 1 wherein said metal cylinder is a material selected from the group consisting of alloy or mild steel and said end ring means are stainless steel.

3. The invention set forth in claim 1 wherein said lining alloy comprises a nickel/cobalt/chromium alloy.

* * * * *